BEST AVAILABLE COPY
S. Dickinson,
Cook Stove.
No. 8,991 X
Patented Aug. 15, 1835.
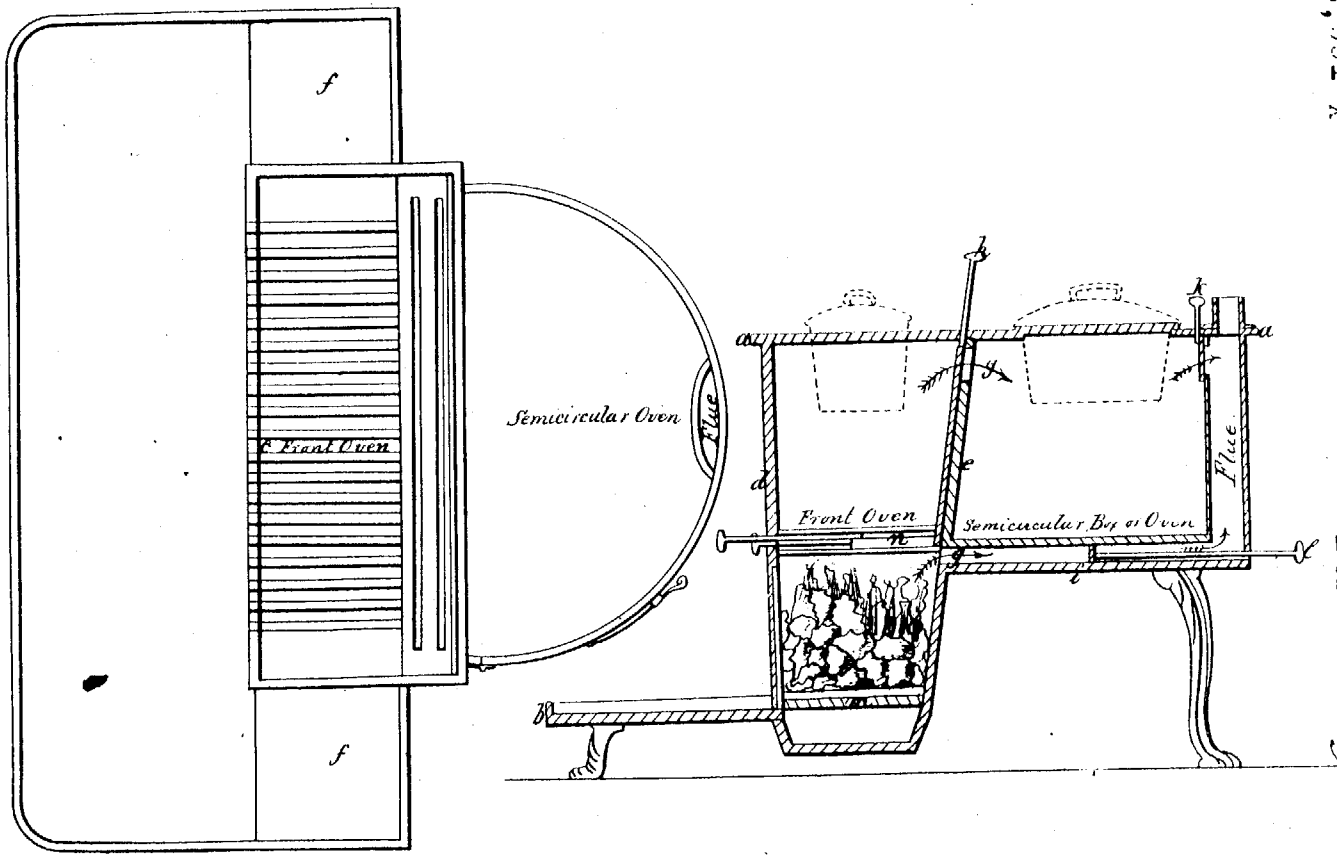
H. PETERS, PHOTO-LITHOGRAPHER, WASHINGTON, D. C.

8991 X Aug 15, 1835

Solomon Dickinson

The Schedule referred to in these Letters Patent and making part
of the same, containing a description in the words of the said Solo
mon Dickinson himself of his improvement in Cooking Stoves _
Specification of Solomon Dickinson's New and useful Improvement In
Cooking Stoves for burning wood or Coal.
In general form, it is an upright oblong _ similar to other modern
cooking Stoves, on its front aspect. It consists of eight plates viz. a top
having perforations to admit Kettles, boilers, &c. A bottom plate _
~~[illegible]~~ extending beyond the front and sides of the Stove, to afford room
&c. convenience of hearth whilst cooking. two side plates with two doors
in each. a front plate. the lower part of which contains the bars for a
grate, and its upper part. in connexion with the sides and back
forms the front oven. immediately behind which is a semicircu-
lar box. narrower than the front, and attached to the upper and back
part of the oblong front oven. constituting another and more spacious
oven, resting upon a leg at its back extremity the whole embraced,
and covered by the top plate with its perforations. The hearth plate
is sunken under the Stove, and forms a shallow box, immediately
underneath the fire. extending from one extreme side to the other
and so situated. that it must receive the ashes and whatever
else, that falls from the consuming materials within the grate.
At each extremity of this sunken box, and immediately outside
of the doors. in the side plates. at which the fuel is introduced,
are ledges, upon which a square plate rests, whose upper sur-
face forms a level in union with the hearth. When this plate
is removed a grid-iron can be substituted for purposes of broi-
ling &c. &c. Between the front oven and the semicircular box, is
the middle plate. dividing the oven of said box. and forms a
part of the front oven. this division plate inclines diagonally
backwards, so as to give a considerable space to the front, in which

8991X is the fire. this space can at all times be contracted by two additional plates called Slides. they must be long enough to reach from one side of the Stove, to the other. and their ends resting upon two projecting ledges firmly attached to the side plates. within and immediately at the lower part of the upper doors, in the side plates. each Slide extending transversely upon the ledges opposite the space occupied by the fire, beneath, and forming by such division the bottom of the front oven. The slides must be bevelled at the edges of their junction. so as to lap over each bevel, and form one entire plate. and when baking is required in both ovens, and the boilers not in use. they are spread out to their utmost extent. but when heat is to be applied to the boilers. either in front or back or both, the slides must be slipped together, leaving an opening their whole length. regulated more or less as occasion requires, either at the front or back of the oven. for the heat to pass thro. a ridge runs along the whole length of the slides to prevent their being slipped over one another too far, and acts as a gage to the regulation for the heat. In the middle of the incline division plate. is a transverse cut or opening at the segment of the semicircular box. immediately beneath the slides. and a similar one in the upper extremity of the plate. these cuts or openings can be closed at pleasure by an extensive valve, passing up and down, to cover either cut, when the heat is to shut out, from passing thro. it. The lower opening forms a vacuum, for the passage of heat and smoke, between two plates. one is the bottom of the semicircular box. and the other is a false plate. placed just above the transverse cut, so as to form the vacuum, and is the bottom of the oven of the semicircular box. When it is desirable to shut down the valve, upon the lower transverse cut. the upper cut is consequently opened. the heat and smoke necessarily will pass into the oven, and surround the boiler upon the top of the

8991X semicircular box. and afterwards discharges itself, thro another
opening at the upper and back part, and within the oven,
entering at the flue, where also is placed another valve to com-
mand the escape when the heat is required to pass thro the va-
cuum below formed by the two plates at the bottom of the semicir-
cular box, and which has a scraper affixed behind it, to clean
out the soot occasionally. The grate to contain fuel may be
made of perpendicular bars, and attached to the plate in front,
or cast with it and another grate made separately, and placed
horizontally, over the sunken box, of the hearth to be raised or
lowered at pleasure, so as to diminish or increase the quantum
of fuel. this grate will form the bottom of the fire place, as
in general use in the ordinary stove. The improvements of the
above invention, which are new, and for which I now claim
the exclusive priviledge of a patent. are the slides, the large
valve with the cuts or openings. in the diagonal plate, and
the passage for the heat, and smoke, caused by the cuts,
and in the vacuum below, in the semicircular box. These
constitute my claims, and have never to my knowledge or
belief been heretofore applied to the purposes of cooking -
certainly have never been seen or heard of before by me.

Witness S. Badger
P. Antrim

Solomon Dickinson ([illegible] only)

Patented August 15th 1835.

Drawing [illegible]